(12) United States Patent
Blossey et al.

(10) Patent No.: US 10,339,597 B1
(45) Date of Patent: Jul. 2, 2019

(54) SYSTEMS AND METHODS FOR VIRTUAL BODY MEASUREMENTS AND MODELING APPAREL

(71) Applicants: Eric Blossey, Lakewood, CO (US); Varun Mehta, Raleigh, NC (US)

(72) Inventors: Eric Blossey, Lakewood, CO (US); Varun Mehta, Raleigh, NC (US)

(*) Notice: Subject to any disclaimer, the term of this patent is extended or adjusted under 35 U.S.C. 154(b) by 0 days.

(21) Appl. No.: 15/948,952

(22) Filed: Apr. 9, 2018

(51) Int. Cl.
  *G06Q 30/06* (2012.01)
  *G06T 19/00* (2011.01)

(52) U.S. Cl.
  CPC ....... *G06Q 30/0643* (2013.01); *G06T 19/006* (2013.01); *G06Q 30/0623* (2013.01)

(58) Field of Classification Search
  CPC ........... G06Q 30/0643; G06Q 30/0623; G06Q 30/0601
  See application file for complete search history.

(56) References Cited

U.S. PATENT DOCUMENTS

| | | | |
|---|---|---|---|
| 2003/0036980 A1* | 2/2003 | Wren | G06Q 30/02 705/14.54 |
| 2010/0070384 A1* | 3/2010 | Kruusmaa | A41H 1/00 705/26.1 |
| 2014/0168217 A1* | 6/2014 | Kim | G06T 13/40 345/420 |
| 2015/0221090 A1* | 8/2015 | Haddad | G06T 7/0022 382/111 |
| 2016/0284075 A1* | 9/2016 | Phan | G06T 7/001 |
| 2016/0378061 A1* | 12/2016 | Reinhardt | G07D 7/121 382/154 |
| 2017/0156430 A1* | 6/2017 | Karavaev | A41H 1/02 |
| 2017/0278272 A1* | 9/2017 | Ravindra | G06T 11/00 |

* cited by examiner

*Primary Examiner* — Yi Yang
(74) *Attorney, Agent, or Firm* — Sheppard, Mullin, Richter & Hampton LLP

(57) ABSTRACT

Systems and methods for virtually measuring one or more aspects of a subject, e.g., human subject are provided. Based on a plurality of images, e.g., two images, body measurements of a subject may be derived and used to generate a virtual model. The virtual model can be used as a mechanism for modeling virtual clothing for presentation to a user. Characteristics of the clothing, e.g., sizing, colors, etc., can be rendered on the virtual model providing the user with an accurate virtual reality fitting room experience.

6 Claims, 10 Drawing Sheets

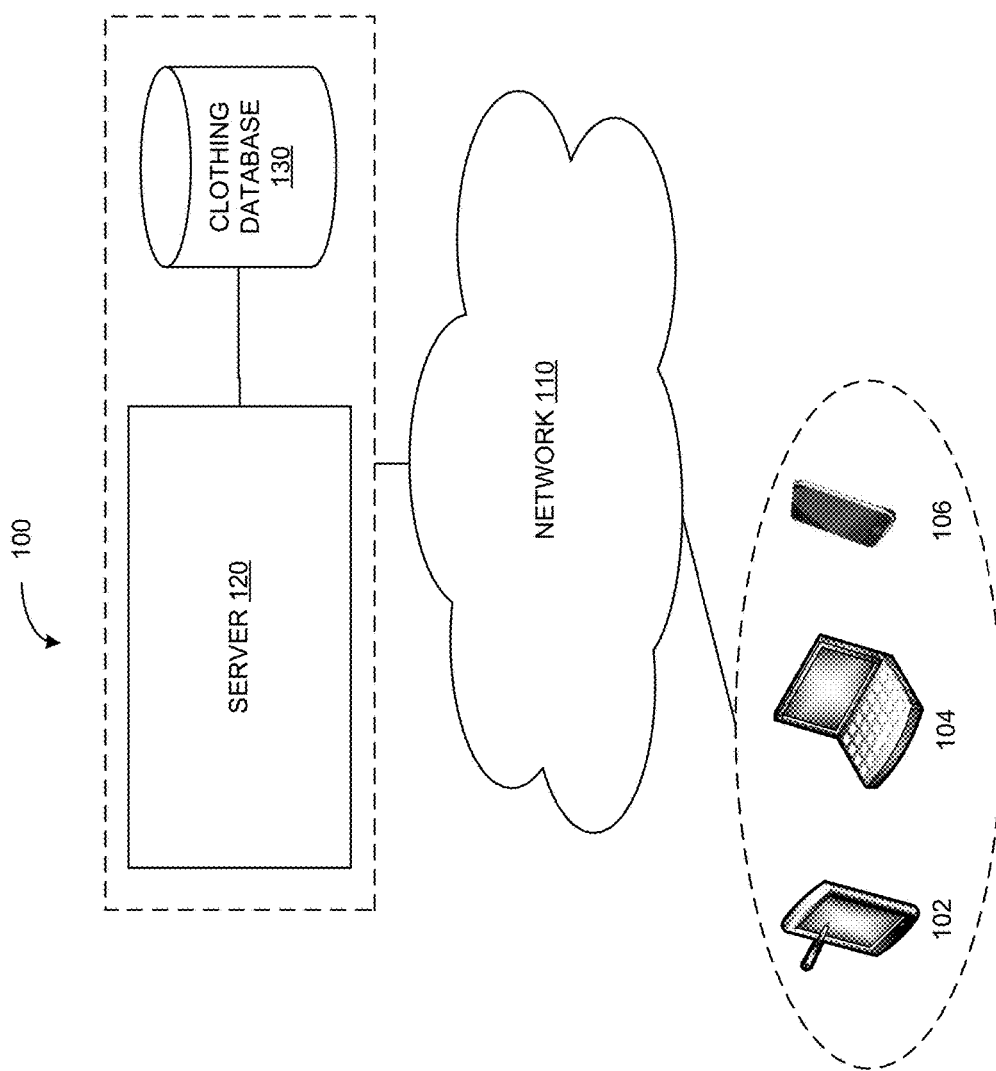

SYSTEMS AND METHODS FOR VIRTUAL BODY MEASUREMENTS AND MODELING APPAREL

TECHNICAL FIELD

The present disclosure relates generally to imaging and modeling, and more particularly to virtual measurements and modeling based on the virtual measurements.

DESCRIPTION OF THE RELATED ART

Virtual reality (VR) can refer to the creation of a virtual world/space experience that users may interact with. For example, computer-generated graphics may be used to create a simulated world or experience with which a user can interact. Oftentimes, a goal of VR systems or applications is to provide realism and as immersive an experience as possible.

Use of the Internet has changed the landscape of retail purchasing for consumers. For example, many consumers may purchase items through online retailers without having to visit a bricks and mortar store. In the case of products, such as books, toys, and even vehicles, consumers may read descriptions and/or view representative photographs of merchandise to be purchased. In the case of goods, e.g., clothing, consumers still tend to prefer visiting bricks and mortar stores in order to gauge the fit and finish of such goods. However, even when a consumer does visit a bricks and mortar store, the process of trying on clothing can be tedious and time consuming.

Although clothing is increasingly becoming available through online retailers, a consumer can only guess whether or not the clothing will fit properly, look pleasing, etc. Thus, consumers may order a particular piece of clothing, only to return it for another size, color, and/or configuration. Consumers may often purchase multiple sizes of a particular piece of clothing, hoping one will fit and returning those that do not. Regardless, the purchasing process is inefficient due to the need to return items, and one or both of the consumer and online retailer may incur additional expense to accommodate the return of items. Some online retailers provide size guides or charts, various views of clothing, e.g., 360-degree views, and other mechanisms that aid a consumer in the purchase of, e.g., clothing. Nevertheless, a consumer is still only guessing how that clothing will fit on his or her body, not to mention that sizing of clothing can vary greatly from manufacturer to manufacturer.

BRIEF SUMMARY OF THE DISCLOSURE

In accordance with one embodiment, a computer-implemented method comprises deriving body measurements of a physical subject from a plurality of images representative of the physical subject's body. A virtual model representative of the physical subject based on the derived measurements can be generated such that the virtual model comprises a body having one or more portions thereof that are equivalent to that of the physical subject. Moreover, a virtual three-dimensional (3D) rending of the virtual model outfitted with one or more items of clothing can be presented.

In some embodiments, the plurality of images comprise a first image representative of a front view of the physical subject. In some embodiments, deriving the body measurements comprises deriving vertically-based body measurements from the first image. In some embodiments, the vertically-based body measurements comprise at least one of a measurement of the distance between the physical subject's neck and the physical subject's waist, an inseam measurement, and a rise measurement.

In some embodiments, the plurality of images comprise a second image representative of a side view of the physical subject. In some embodiments, deriving the body measurements comprises deriving girth-based body measurements from the second image.

In some embodiments, the girth-based body measurements comprise at least one a chest girth measurement, a bust girth measurement, a waist girth measurement, a hip girth measurement, and a thigh girth measurement.

In some embodiments, the plurality of images are received from a user device at which a quality of each of the plurality of images is checked. In some embodiments, the quality check of each of the plurality of images comprises a quality check of focus, distance from the physical subject to the user device, and lighting.

In some embodiments, the one or more items of clothing are selected from a database comprising information representative of one or more characteristics of the one or more items of clothing. In some embodiments, the one or more characteristics of the one or more items of clothing comprises fitment measurements correlating to the derived body measurements.

In accordance with one embodiment, a server may include one or more processors and a memory storing instructions that, when executed by the one or more processors, cause the server to: derive body measurements of a human subject from a plurality of images representative of the human subject's body; generate a virtual model representative of the human subject based on the derived measurements such that the virtual model comprises a body having one or more portions thereof that are equivalent to that of the human subject; obtain information regarding characteristics of one or more items of clothing; and present a virtual three-dimensional (3D) rending of the virtual model outfitted with one or more items of clothing, the virtual 3D rendering representing the characteristics of the one or more items of clothing relative to the virtual model.

In some embodiments, the system further comprises a user device operatively connected to the server remotely located from the user device, the user device capturing the plurality of images. In some embodiments, the user device further performs a quality check of each of the plurality of images to determine suitability of each of the plurality of images for the derivation of the body measurements. In some embodiments, the plurality of images comprise a first image representative of a front view of the physical subject, and a second image representative of a side view of the human subject. In some embodiments, the instructions causing the system to derive the body measurements comprises instructions causing the system to derive vertically-based body measurements from the first image. In some embodiments, the instructions causing the system to derive the body measurements comprises instructions causing the system to derive girth-based body measurements from the second image.

In some embodiments, the instructions causing the server to obtain information regarding the characteristics of the one or more items of clothing comprise instructions causing the server to access a database in which the information regarding the characteristics of the one or more items of clothing are stored. In some embodiments, the information regarding the characteristics of the one or more items are obtained by deriving measurements of the one or more items of clothing from a plurality of images representative of the one or more items of clothing being worn by one or more physical mannequins. In some embodiments, the plurality of images are captured by one or more camera-equipped unmanned vehicles traversing one or more routes about the one or more physical mannequins.

In accordance with one embodiment, a computer-implemented method comprises deriving body measurements of a physical subject from a plurality of images representative of the physical subject's body. The computer-implemented method may further comprise verifying one or more of the derived body measurements. Upon verification of the one or more of the derived body measurements, the computer-implemented method may comprise searching for one or more items of clothing having fit dimensions matching the derived body measurements. Moreover, the computer-implemented method may comprise presenting one or more images of a physical model wearing the one or more items of clothing having fit dimensions matching the derived body measurements. In some embodiments, the derivation of body measurements comprises overlaying each of the plurality of images on images of the physical model and calculating any differences between body parts of the subject's body relative to the physical model.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1A is an example virtual measurement and modeling system in accordance with one embodiment.

Figure 1B:
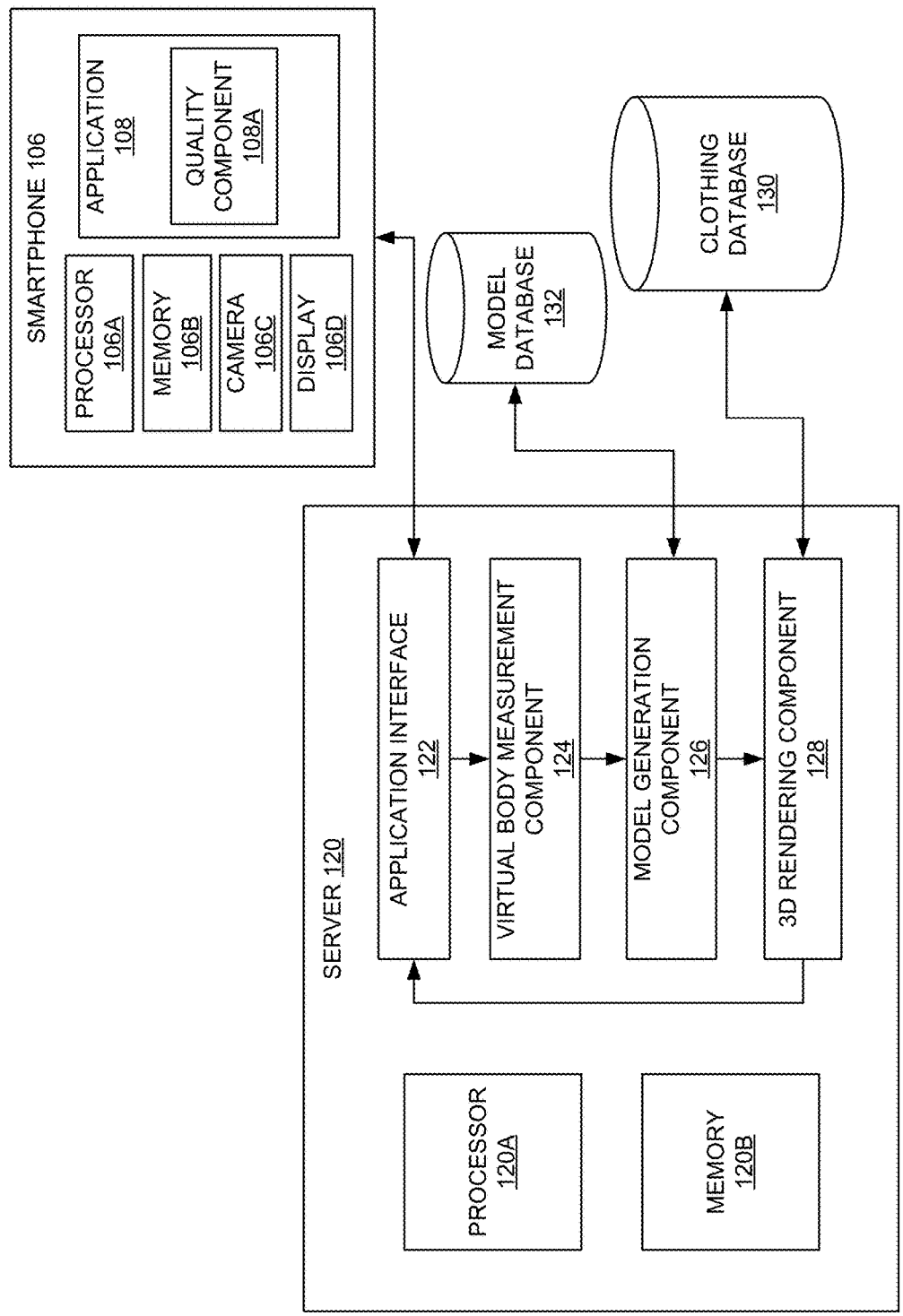
FIG. 1B is an example architecture of a server in the virtual measurement and modeling system of FIG. 1A.

The figures are not exhaustive and do not limit the present disclosure to the precise form disclosed.

DETAILED DESCRIPTION

As alluded to above, the traditional act of purchasing clothing can involve repeated attempts at trying on various clothing, e.g., different sizes, different colors, different styles, etc., to determine that the clothing fits in a desired manner and/or is aesthetically pleasing. Conventional systems and methods for remotely purchasing clothing, e.g., online purchasing, can also be inefficient, costly, and/or inaccurate.

Accordingly, various embodiments are directed to systems and methods for virtually determining body measurements of a subject, e.g., a human consumer, and creating a virtual modeling experience. A consumer may capture images, e.g., two pictures (in some embodiments) of him or herself, using a camera of a smartphone or other user device on which a virtual measurement and modeling application is running. In some embodiments, the application may perform certain quality checks on the captured images to ensure the subject's body measurements can be accurately determined from the captured images. The application may transmit the captured images to a remotely located server that can process the captured images, and determine the subject's relevant body measurements. The remotely located server may generate a virtual model commensurate with the subject's body measurements. Visual, e.g., three-dimensional (3D) representations of clothing, may then be presented using that virtual model. In other embodiments, available clothing may be modeled using physical models, e.g., adaptable/adjustable mannequins, representations of which may be presented to the consumer.

It should be understood that various embodiments of the present disclosure described herein need not be limited to human subjects. Other subjects, e.g., pets, furniture, etc., that may need to be fitted, can be virtually measured and modeled with virtual coverings. Indeed, the user need not be the subject. Moreover, it should be understood that applications of the various embodiments disclosed herein need not be limited to retail or purchasing scenarios. For example, a manager of a bricks and mortar retail establishment may wish to obtain clothing for display, and a subject may be one or more mannequins. Further still, it should be understood that the various functions of a virtual measurement and modeling system as described herein may be implemented in different ways. For example, in some embodiments, processing-intensive functions such as the aforementioned virtual body measurement may be relegated to a remote server. However, in other embodiments, provided a user device, e.g., smartphone, laptop, or other similar processing device is capable, the virtual body measurements may be performed with the same device used to capture images. Still other embodiments and variations will be disclosed below.

FIG. 1A is a diagram illustrating an example system 100 in which various embodiments can be implemented. System 100 may include one or more user devices through which images for determining body measurements may be captured, and through which a VR modeling experience can be provided. For example, a user may utilize a tablet computing device 102, a laptop computer 104, or a smartphone 106 to capture images and experience VR modeling in accordance with various embodiments. It should be noted that other devices, such as computer gaming systems, desktop computers, head-mounted display, etc., or some combination of the above may be used in accordance with other embodiments. These user devices may be used to capture images of a subject that can be virtually modeled. For example, a consumer may use smartphone 106 to capture, e.g., two images, of him or herself as the subject, by way of a virtual measurement and modeling application. The two images may be a side view image and a front view image of the subject.

Moreover, in some embodiments, the virtual measurement and modeling application may include a quality check component for determining whether the captured images are of sufficient quality so that body measurements can be determined based on the captured images. For example, the images of the subject may have been captured under low light conditions (leading to an inability to distinguish the bodily features of the subject), or the images of the subject may be overexposed (again leading to an inability to recognize one or more bodily features). As another example, one or more portions of the subject may not be in focus, leading to an inability to derive accurate body measurements. If the captured images are deemed to be insufficient for deriving the relevant body measurements, the virtual measurement and modeling application may notify the user with an error message, and/or provide instructions to re-take one or more images, etc.

In accordance with one embodiment, physical mannequins having one or more adjustable aspects, e.g., adjustable waist, girth, arm length, shoulder width, etc. may be used as a basis for deriving the relevant body measurements. For example, a plurality of physical mannequins can be configured, each with varying measurements. The plurality of physical mannequins may be categorized based on certain body types/ranges of body types. Images of the plurality of physical mannequins may be captured and stored.

The front and side view images captured by the user device, e.g., smartphone 106, may be used as an overlay onto virtual representation of a physical mannequin. That is, upon receipt of a subject's representative images, a match can be made to a particular one of the physical mannequins, and the images of the subject may be overlaid on the images associated with the selected physical mannequin. Based on the overlay of these images, all relevant measurements of the subject can be derived. That is, any differences between the subject images and that of the physical mannequin can be calculated and represented as a particular body measurement. When a certain aspect of the subject matches that of the physical mannequin vis-à-vis the image overlays, the subject can be assumed to have the same measurements regarding that aspect, body part, etc. as the physical mannequin. It should be noted that the term "match" as used herein need not refer to an exact match. It should be understood that due to manufacturing tolerances, user preference, measurement methods, etc., there can be some variation accounted for when, e.g., looking for clothing that "matches" the body measurements of a subject.

It should be noted that in some embodiments, a video of the subject may be captured and used to derive relevant body measurements. Moreover, in some embodiments, the aforementioned virtual measurement and modeling application need not be used for the capturing of images or videos. For example, a camera and camera-related software or application(s) resident on smartphone 106 can simply capture images/video of the subject. Such images/video may then be transmitted for processing (described below).

In some embodiments, the images/video may be transmitted to the virtual measurement and modeling application to be checked for quality purposes prior to being transmitted for processing (i.e., the actual derivation of relevant body measurements). The images and/or video may be formatted in accordance with any relevant visual media standard, e.g., jpg, gif, mp4, etc. For example, image/video conditions may be analyzed, e.g., the captured imaged/video may be checked for proper or adequate lighting, an appropriate distance between the subject and camera (e.g., to avoid distortion effects that may skew the body measurements), and focusing of the subject.

In some embodiments, a feedback mechanism may be implemented. That is, upon deriving the body measurements of a subject, one or more of those body measurements may be relayed back to the user. For example, the virtual measurement and modeling application may transmit a message or notify the user that the subject's waist measurement is 32" and ask for confirmation. If the user confirms that the derived body measurement is correct or "close," the virtual measurement and modeling application can assume the image/video quality was sufficient for obtaining the relevant body measurements. If the user indicates some discrepancy between the derived body measurement and what the user understands the subject's body measurement to be, the virtual measurement and modeling application can notify the user to make one or more adjustments affecting image quality. For example, the virtual measurement and modeling application may suggest the user/subject move to an area with better lighting, an area with more contrast, etc. Accordingly, the user can retake front and side view images and the relevant body measurements may be re-derived, re-checked/verified, and so on.

System 100 may further include one or more servers operatively connected to one or more clothing databases. An example of the one or more servers, e.g., server 120, may be remotely located from the aforementioned user devices (e.g., tablet computing device 102, laptop computer 104, and smartphone 106). Server 120 may be used to process images or video of a subject in order to determine or derive body measurements of the subject that can be used to generate a virtual model of the subject. Following the above example, server 120 can communicate (over one or more networks 110) with smartphone 106 to obtain the images of a subject captured by smartphone 106.

It should be noted that generally, images or video of a subject's entire body can be used to determine relevant body measurements that can be used to generate a virtual, full-body model of the subject. If a user captures images/video of only a portion of the subject, e.g., images of a subject's upper body/torso, server 120 may generate a commensurate virtual model, i.e., a virtual, upper body/torso model of the subject. Indeed, a user may wish to determine fit with respect to only a portion of the subject. For example, the user may wish to gauge how a shirt or blouse fits, but is uninterested in below-the-waist clothing. Accordingly, less measurements are needed, reducing image/video size (thereby impacting storage/cache operation), reducing the amount of processing needed, etc.

Upon deriving the relevant body measurements from the images/video captured by the user device, e.g., smartphone 106, server 120 can generate a virtual model of the subject based on the derived body measurements. In some embodiments, a default virtual model can be altered/adjusted in accordance with the derived body measurements to arrive at an accurate representation of the subject. In the case of body measurements for the purposes of determining the fit of clothing, the virtual model may be embodied as a virtual mannequin on which virtual clothing may be modeled for presentation to the user. Other appropriate virtual models can be generated depending on the subject of interest.

Once a virtual model has been generated, a user, through the virtual measurement and modeling application, may select one or more items of clothing, accessories, or other relevant covering to be presented on the virtual model. For example, smartphone 106 may present any number of items that can be modeled on the virtual model generated based on the subject's body measurements. Information representative of and/or characterizing the items can be stored in and accessed from a database, such as clothing database 130. That is, information regarding sizing, color, shape, etc. of an item, such as a dress, can be obtained from clothing database 130. In some embodiments, sizing characteristics of the clothing that are stored in clothing database 130 may be the same or similar to those measurements derived from the images/video of a subject. In this way, server 120 can determine how an item of clothing would fit/look on the virtual model, and reflect this fit/look by generating a VR representation that can be presented to the user.

For example, the relevant body measurements of a human subject may include, but are not limited to the following: bust/chest, waist girth, hip girth, thigh girth, waist to back of neck, inseam and rise. The same measurements can be taken of clothing items or clothing item measurements that are correlated with or can be translated into those measurements can be obtained and stored in clothing database 130.

In some embodiments, creation of a virtual model may be bypassed. As alluded to above, some embodiments may utilize physical mannequins for deriving relevant body measurements of a subject. Those physical mannequins may also be used to physically model clothing. That is, due to the adjustability of the physical mannequins, they can be made to represent different body types and/or body measurements. Different sizes of clothing can be modeled on a different physical mannequins. Upon determining a match between a subject's body measurements and that of a representative physical mannequin, clothes modeled on that particular physical mannequin can be presented to the user.

As also noted above, in some embodiments, the processing of images/video to derive relevant body measurements can be performed in a user device through, e.g., the virtual measurement and modeling application. For example, once the images/video of the subject are obtained by smartphone 106, the virtual measurement and modeling application running on smartphone 106 may derive the relevant body measurements. Moreover, the virtual measurement and modeling application may generate a virtual model of the subject, communicate with clothing database 130 to obtain characteristics of clothing items, and further generate a VR experience in which the selected clothing is modeled. In such a scenario, communications traffic can be reduced, for example.

It should be understood that multiple servers and clothing databases may be present in system 100. In some embodiments, one or more servers and one or more clothing databases may be controlled by an entity, such as a retail establishment, a clothing manufacturer, or the like. Accordingly, multiple sets of servers and clothing databases may be accessed by a user. For example, the virtual measurement and modeling application may specify particular retailers, clothing manufacturers, and similar entities. Depending on which of these entities a user selects, a particular server(s) and/or clothing database(s) may be used and accessed to achieve the functionality of the various embodiments described herein. For example, a particular retailer may operate a server for receiving images/videos of subjects and derive relevant body measurements. In some embodiments, a user may select a particular type of clothing without regard for where the clothing is being sold or by whom. Depending on whether the user selects women's or men's clothing, or selects a particular type of category of clothing, a particular clothing database may be accessed to provide a user with the appropriate clothing information for generating a VR modeling experience.

Network 110 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 110 may employ various communication media, such as a coaxial cable, fiber optic cable system, Ethernet, radio waves, etc. Further still, network 110 may be one or more combinations of any of the aforementioned networks.

Figure 2A:
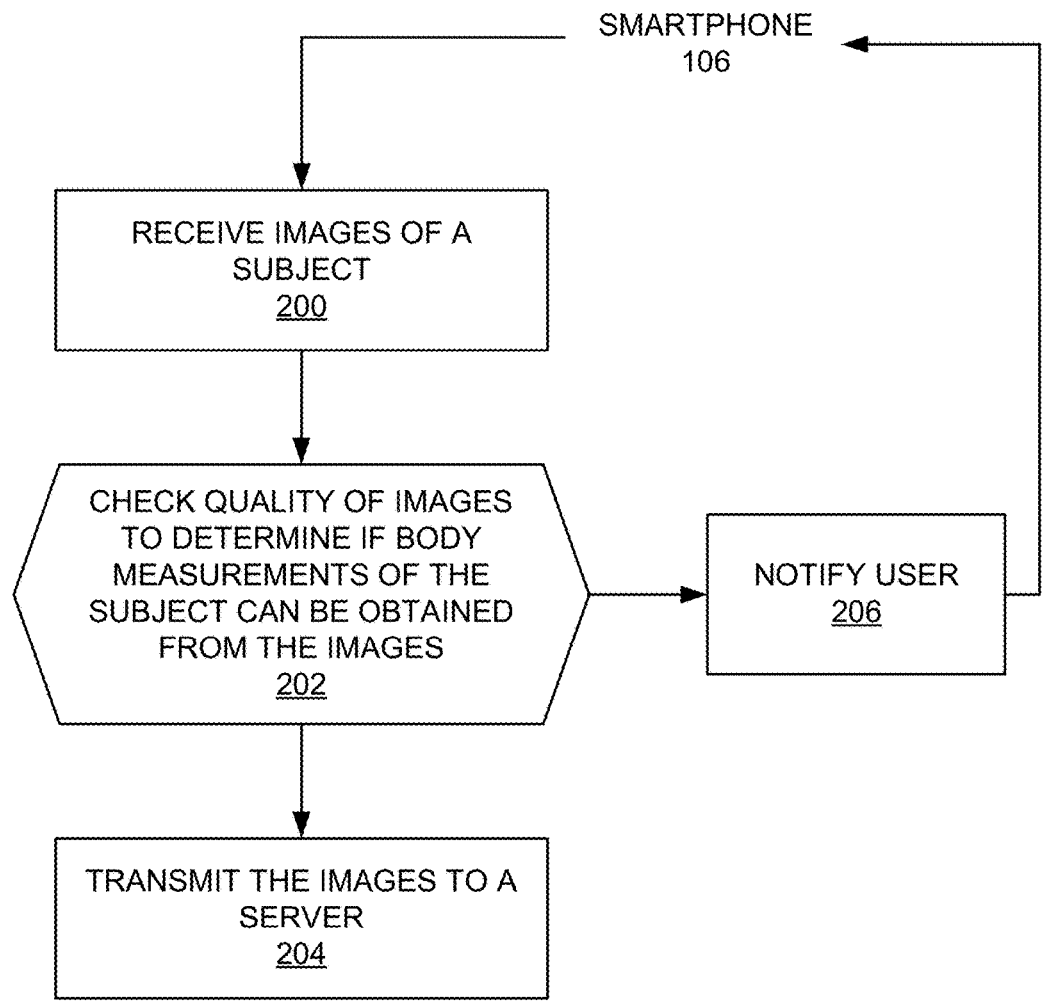
FIG. 2A is an operational flow diagram illustrating an example process for picture reception and verification that may be performed by a user application of the virtual measurement and modeling system of FIG. 1A.
Figure 2B:
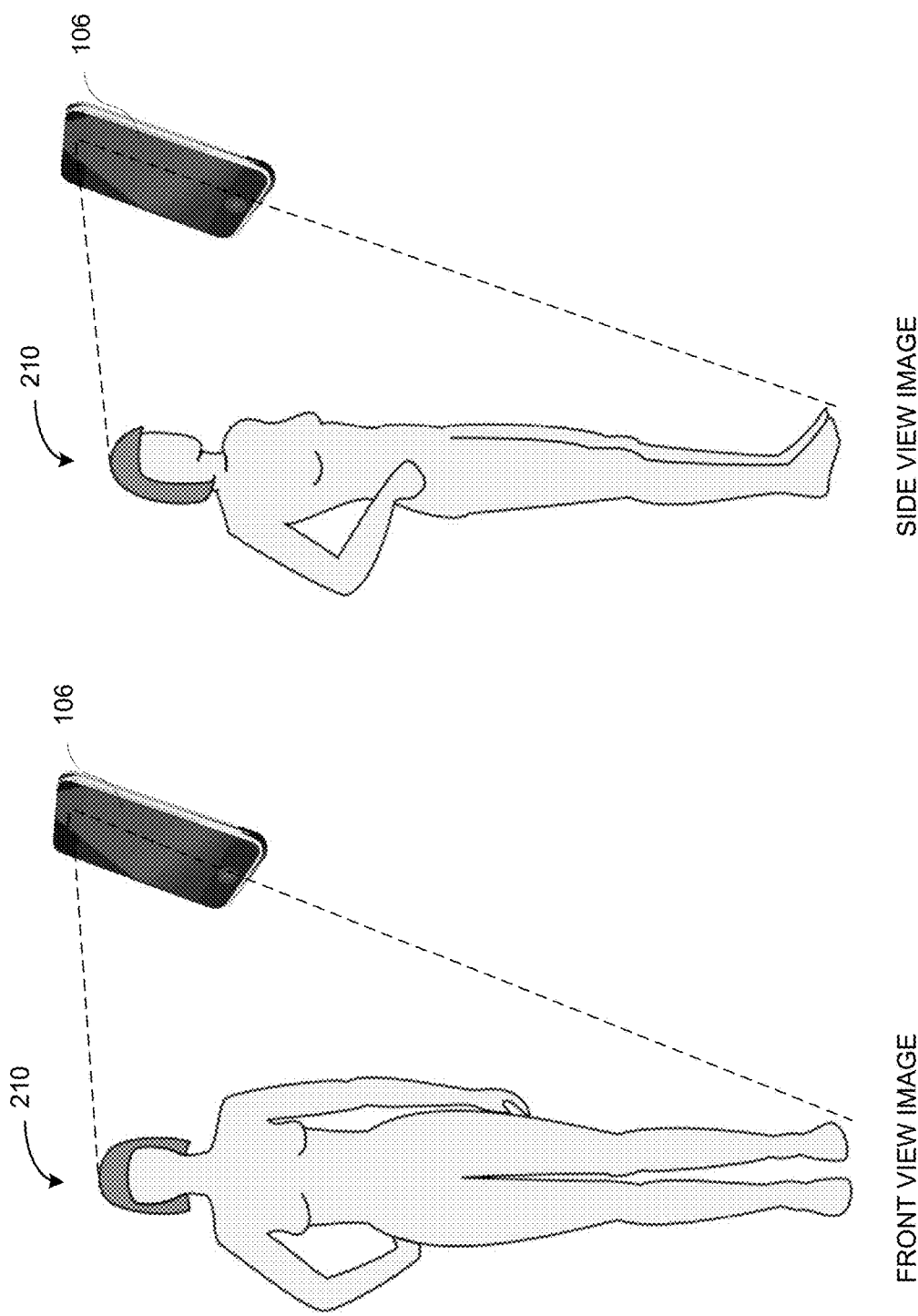
FIG. 2B illustrates an example scenario for obtaining pictures to be used for determining body measurements in accordance with one embodiment.

As noted above, a user may capture two images of a subject, such as the user him/herself, e.g., a front view image and a side view image. Accordingly, the user may use, in this example, smartphone 106 to capture the two images. Referring to FIGS. 1B, 2A, and 2B, smartphone 106 may include a processor 106A, a memory unit 106B, a camera 106C, a display 106D, and the virtual measurement and modeling application 108 that can include a quality component 108A. The virtual measurement and modeling application may be stored in memory unit 106B and executed under the control of processor 106A.

In some embodiments, as illustrated in FIG. 2A, virtual measurement and modeling application 108 may receive images of a subject, e.g., from camera 106C of smartphone 106, at operation 200. In some embodiments the images may be stored or cached in memory unit 106B of smartphone 106. Referring to FIG. 2B, as described above, a user 210 may be a consumer or other purchaser, for example, wishing to purchase clothing for herself. Accordingly, user 210 may use camera 106B of smartphone 106 to take a front view image of herself, as well as a side view image of herself. As described above, only two images may be needed to derive the relevant body measurements of user 210. In the event smartphone 106 has more than one camera, it should be understood that either camera may be used, e.g., either a front-facing camera, or a rear-facing camera. In still other embodiments, smartphone 106 may have a dual-camera implementation, which can aid in improving depth perception, which in turn, may allow for better body measurement derivation from the two images. In some embodiments, the generation of the aforementioned notification to re-take one or more images may include suggesting to user 210, that she may wish to try using the rear-facing camera (as oftentimes, the rear-facing camera of smartphones have better resolution, focusing capabilities, etc.).

Upon capturing the two images, quality component 108A, under the control of processor 106A, may analyze/check the quality of the images to determine if they are of sufficient quality to derive body measurements of the subject at operation 202 (FIG. 2A). In some embodiments, this can include deriving body measurements of the subject and notifying user 210 of one or more of those derived body measurements. For example, a commonly known or referred-to body measurement, such as waist size may be presented via a user interface of virtual measurement and modeling application 108. User 210 can input feedback as to whether or not the derived body measurement is accurate or accurate enough. It should be understood that a certain range regarding a particular body measurement may be deemed acceptable for purposes of deriving body measurements. Hence, in some embodiments, virtual measurement and modeling application 108 may indicate to user 210 that if the user's perceived body measurement is within that acceptable range (e.g., 0.5 inches more or less), to indicate confirmation of the derived body measurement. In some embodiments, categories can be assigned to ranges within or outside of a user's known/perceived body measurements. For example, if the derived body measurement is more than 20% off, it can be assumed that the image did not meeting the requisite quality due to lighting issues, in which case, a suggestion to improve lighting can be made. If the derived body measurement is within 10% of the user's known/perceived body measurement, it can be assumed to be a result of poor contrast. Again, a suggestion can be made to the user to adjust positioning/location, adjust camera white balance etc. to obtain better contrast.

If the quality of the two images is sufficient, the images may be transmitted from, e.g., the memory unit 106B of smartphone 106, to server 120 at operation 204 (FIG. 2A). If the one or more both of the two images are not of sufficient quality, user 210 may be notified at operation 206 (FIG. 2A). That is, in some embodiments, application 108 may generate an error message, instruction(s) to re-take one or more images, or other appropriate notification, as described above. User 210 may then attempt to readjust her positioning, readjust positioning of smartphone 106, improve the lighting conditions, etc.

Referring back to FIG. 1B, server 120 is illustrated as including at least one processor 120A and at least one memory unit 120B. Server 120 may further include an application interface 122 for communicating with a user device, in this example, smartphone 106, a virtual body measurement component 124, a virtual model generation component 126, and a 3D rendering component 128.

Figure 3A:
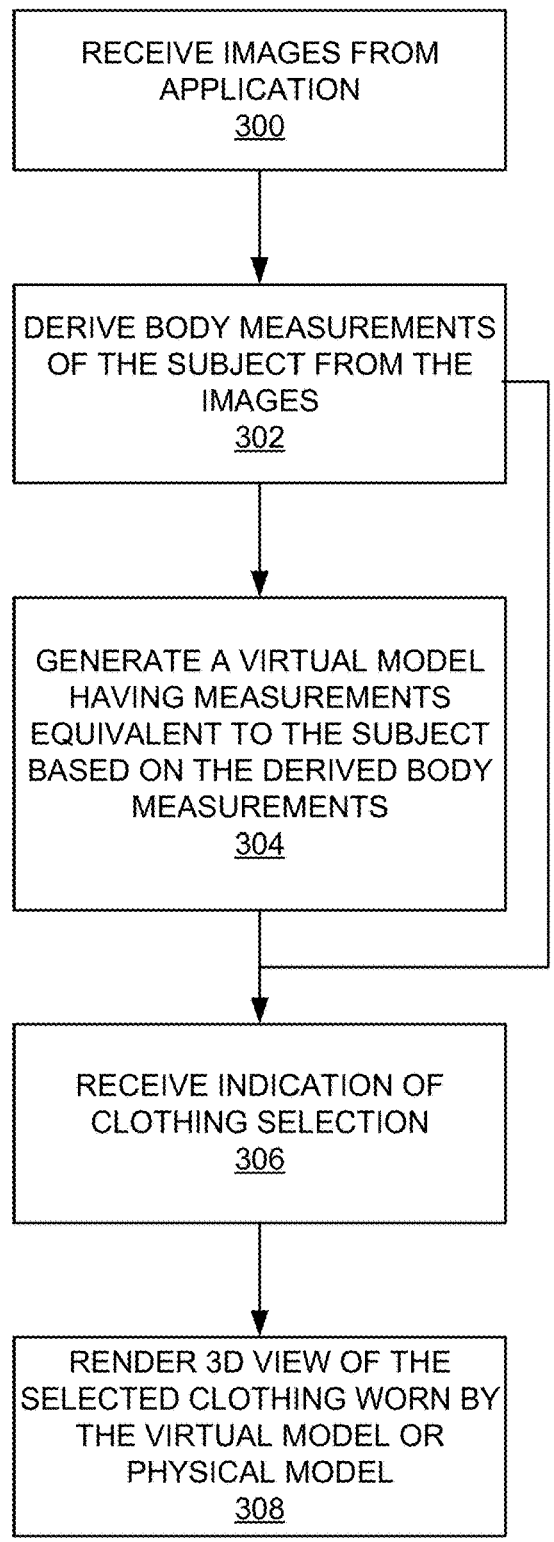
FIG. 3A is an operational flow diagram illustrating an example process for determining body measurements and effectuating virtual modeling in accordance with one embodiment.

Referring to FIG. 3A, the images are received from the virtual measurement and modeling application at operation 300. That is, and as noted above, if the two images are of sufficient quality, the images may be transmitted from, e.g., the memory unit 106B of smartphone 106, to server 120, in particular, to application interface 122. The transfer of images from smartphone 106 to server 120 may occur via network 110. The images may be stored in memory 120B of server 120.

At operation 302, the images may be used to derive body measurements of the subject. That is, under the control of processor 120A, virtual body measurement component 124 may analyze the stored images and derive the body measurements of the subject (e.g., user 210). In some embodiments, girth-based measurements may be derived from the side view image, while any vertically-based measurements, e.g., inseam and rise, can be derived from the front view image.

Virtual body measurement component 124 may, in some embodiments, overlay the images of the subject, e.g., user 210, unto representative images of a physical mannequin having at some a minimum correspondence (body measurement-wise) with the subject. Relevant body measurements may then be derived based on the overlay of the subject images onto the representative images of the physical mannequin by comparing body parts and calculating any differences. It should be understood that less processing is required to derive relevant body measurements when the physical mannequin selected is as close, body-wise, as possible to the subject. Accordingly, in some embodiments, virtual measurement and modeling application 108 may request that user 210 enter her height/weight to make an initial match with a physical mannequin. Images of the physical mannequins upon which images of a subject can be overlaid may be stored in and accessed from a model database 132.

In some embodiments, a virtual model having measurements equivalent to the subject based on the derived body measurements is generated at operation 304. For example, upon deriving the relevant body measurements of the subject, e.g., user 210 in this example, a virtual model, such as a virtual mannequin may be generated by model generation component 126 with the same body measurements as those of the subject. As noted above, in some embodiments, a default model may already be generated and stored in memory 120B of server 120. Various methods of generating a model may be utilized in accordance with various embodiments. For example, methods such as polygonal modeling, curve modeling, and/or digital sculpting may be used to generate the virtual model. It should be understood that one of ordinary skill in the art would understand how to generate a 3D model of a subject. In the case of polygonal modeling, for example, points in a 3D space (vertices) may be mapped onto each captured image, and connected by line segments to form a polygon mesh that can be rendered by virtual model generation component 126.

If the virtual model is a default virtual model, virtual model generation component 126 may access the default virtual model from memory unit 120B, and the derived measurements of the subject, e.g., user 210, may be used to alter the default virtual model to match the body of user 210. That is, the default virtual model may be a 3D model comprising a mathematical representation of the body surface of a generic or default body. The mathematical representation may then be modified in view of any differences between the mathematical representation of the default virtual model relative to the derived body measurements of the subject.

It should be noted that images of user 210 may be images in which user 210 is wearing clothing. In some embodiments, virtual measurement and modeling application 108 may suggest that to user 210 that he/she should wear tight-fitting clothing so that more accurate/representative body measurements can be derived. In other embodiments, a certain "thickness" attributable to clothing worn by user 210 can be accounted for when deriving body measurements.

It should be noted that the aforementioned physical mannequins can be outfitted with pressure sensors to determine the pressure of any clothing modeled thereon. In this way, "tightness" or "looseness" of clothing fit on the physical mannequins can be determined. This information can be relayed to the user 210, taken into consideration when judging clothing fit, etc.

Referring back to FIG. 3A, a clothing selection indication may be received at operation 306. That is, user 210 can, via a clothing selection interface of the virtual measurement and modeling application 108 of smartphone 106, select one or more items of clothing he/she would like to have rendered three dimensionally on the virtual model. The selection of clothing can be based on one or more items of clothing stored in clothing database 130. For example, display 106D of smartphone 106 may be touchscreen display, and user 210 may select the desired clothing by swiping through visual representations clothing presented on display 106D. The clothing available for selection may be representative of clothing that is likely to fit user 210 based on the derived body measurements of user 210. In some embodiments, any clothing available from a retailer(s), manufacturer(s), or other entity(ies) may be selectable. In other embodiments, a unique identifier may be assigned to information representative of user 210's measurements. That unique identifier may be associated with available clothing matching the requisite measurements of user 210 (i.e., the information to which the unique identifier was assigned). Based on this association, user 210 may be presented with all or some subset of measurement-matching clothing.

It should be understood that information regarding size, color, style, and other characteristics of clothing may be stored in clothing database 130. This information can be obtained through various pre-processing methods. For example, a retailer may input such clothing characteristics information into clothing database 130. That is, for each item of clothing, information regarding its style, size, color, etc. may be input. In some embodiments, pre-processing may comprise automatically generating information regarding clothing characteristics by using an unmanned vehicle equipped with one or more cameras to capture images of mannequins wearing clothing, and deriving the relevant characteristics of that clothing (described below).

Referring back to FIG. 3A, at operation 308, a 3D rendering of the selected clothing being worn by the virtual or physical model (i.e., physical mannequin) may be rendered. That is, 3D rendering component 128 may, based on user 210's clothing selection, access the relevant clothing characteristics information correlated to the clothing selection from clothing database 130. For example virtual measurement and modeling application 108 of smartphone 106 may relay an identifier associated with the selected clothing to 3D rendering component 128 via application interface 122 of server 120. Using that identifier, 3D rendering component 128 may access clothing database 130 to identify clothing characteristics information stored therein associated with a matching identifier. 3D rendering component 128 may then retrieve the associated clothing characteristics information and apply that clothing characteristics information to the virtual model generated by virtual model generation component 126. 3D rendering component 18 may then transmit this rendering to virtual measurement and modeling application 108 so that the virtual model with the selected clothing can be presented on display 106D of smartphone 106. In some embodiments, one or more aspects of 3D rendering component 128 may be implemented as part of the virtual measurement and modeling application 108.

At smartphone 106, display 106D may present the 3D rendering of the virtual model wearing the selected clothing, wherein user 210 can determine whether or not the selected clothing fits and/or appears pleasing to user 210. The virtual model has been generated in accordance with user 210's own body measurements derived from images/video taken of user 210, and the 3D rendering accounts for the selected clothing's measurements. Accordingly the 3D rendering presented to user 210 is an accurate or substantially accurate representation of how the selected clothing would actually fit on user 210. It should be noted that the 3D rendering allows user 210 to experience a 360 degree view of the virtual model wearing the selected clothing.

Figure 3B:
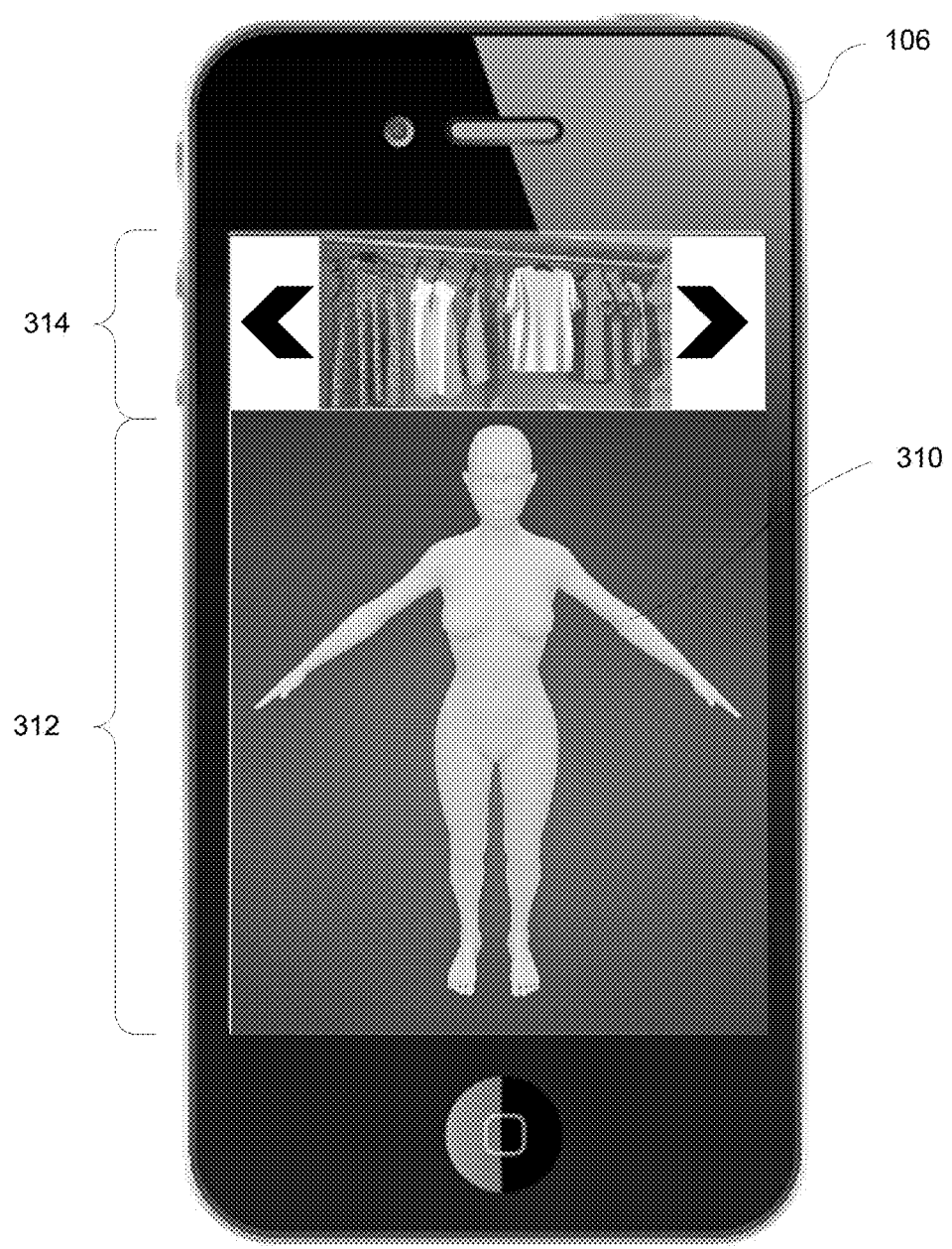
FIG. 3B illustrates an example clothing selection interface presented to a user interacting with or in the virtual measurement and modeling system of FIG. 1A.

For example, FIG. 3B illustrates an example of a virtual model 310 displayed via display 106D of smartphone 106. As noted above, virtual model 310 is a representation of user 210 based on the body measurements of user 210 derived from images/video of user 210. As illustrated in FIG. 3B, virtual model 310 may be presented in a modeling interface 312 of the virtual measurement and modeling application 108. Above, modeling interface 312, a clothing selection interface 314 may be presented. As alluded to above, user 210 may peruse available clothing by, e.g., using the touchscreen capabilities of display 106D to scroll through the clothing selection. It should be noted that a touchscreen interface is not necessary. A user may employ voice commands, use one or more control buttons, etc. of smartphone 106 to control selection of clothing in clothing selection interface 314.

Figure 3C:
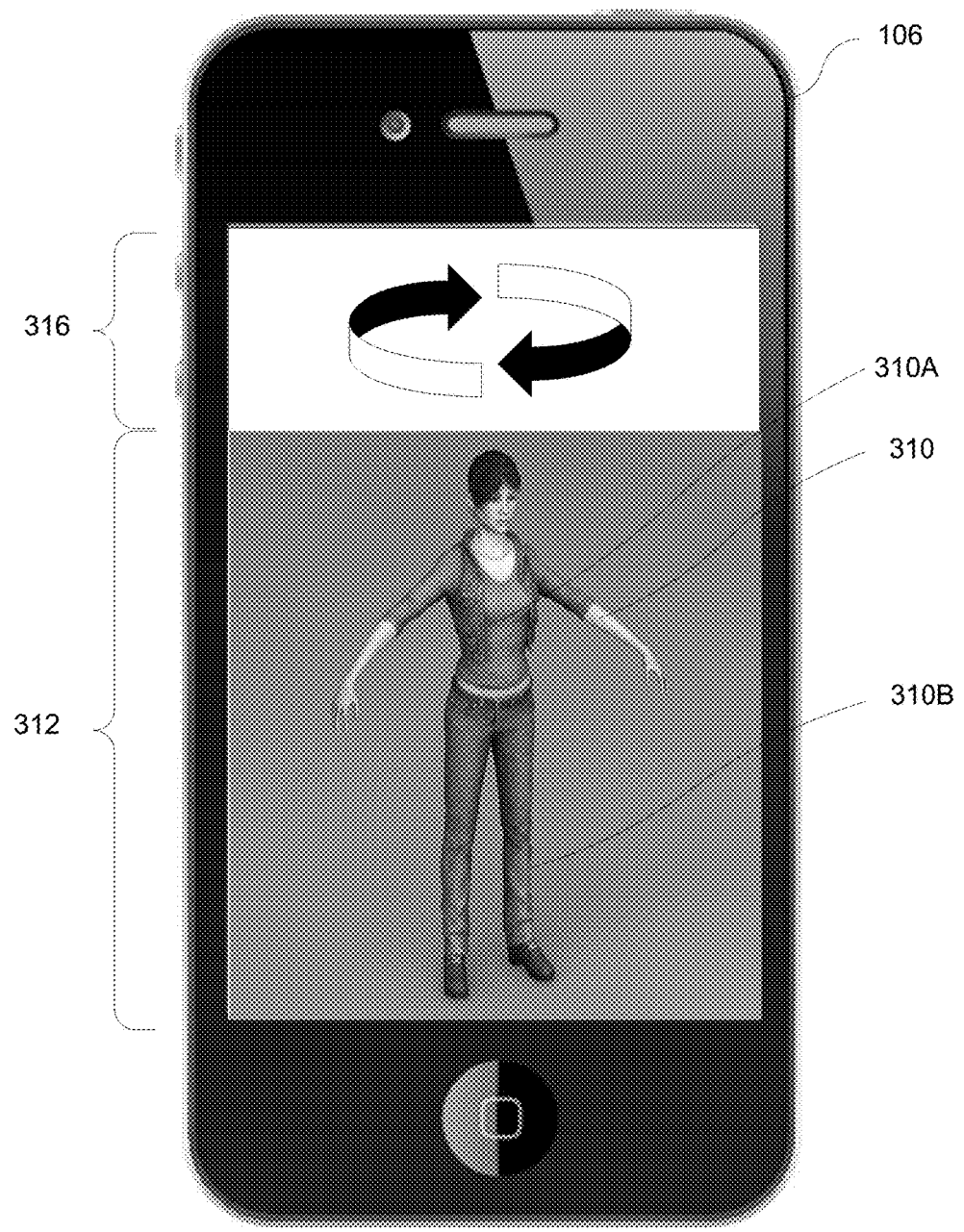
FIGS. 3C and 3D illustrate examples of virtual apparel modeling in accordance with one embodiment.
Figure 3D:
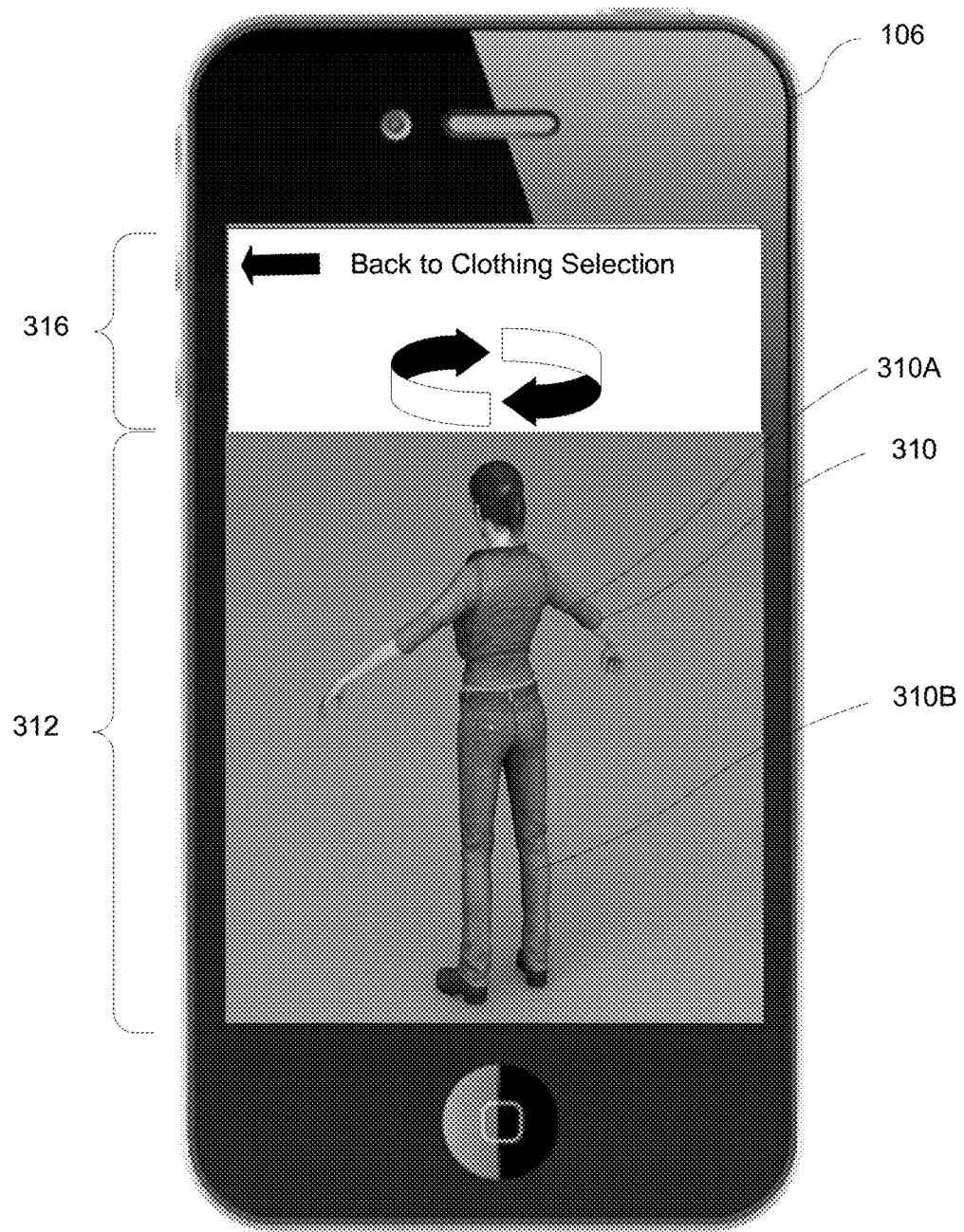

As illustrated in FIGS. 3C and 3D, upon selecting one or more items of clothing that user 210 wishes to see modeled on virtual model 310, a 3D rendering of virtual model 310 wearing the selected clothing may be presented on display 106D. In some embodiments, clothing selection interface 314 may be replaced by a 360 degree view control interface 316. In this way, user 210 may control the 3D rendering presented in modeling interface 312. When user 210 is done viewing the 3D rendering, and wishes to, e.g., select another item(s) of clothing, 360 degree view control interface 316 may include a button or other interface allowing user 210 to return to the clothing selection interface 314.

In other embodiments, as noted above, physical mannequins may be used to model clothing. Images of these physical mannequins may also be presented to user 210, or presented instead of the 3D rendering of the virtual model. It should be understood that video of the physical mannequins modeling the clothing can be presented, as well as a series of images, e.g., images representative of a 360 degree view.

It should be noted that in some embodiments, any user images are deleted from memory, e.g., memory 106B of smartphone 106 (FIG. 1B). For example, virtual measurement and modeling application 108 may automatically instruct processor 106A to delete images captured through or on behalf of virtual measurement and modeling application 108 from memory 106B.

It should also be noted that in some embodiments, user measurements can be saved as profiles for use to match with other users. That is, over time, given sufficient participation by users, a corpus of body measurements can be accumulated, each associated with one or more items of clothing. This information may be stored in, e.g., either or both of model database 132 and clothing database 130. Upon deriving body measurements for a particular user, this information can be accessed and a check can be performed to determine if the user's body measurements match any existing/stored user measurements. If so, clothing associated with the user (e.g., bought, rented, etc.) whose measurements have previously been stored can be presented to the current user. In this way, virtual measurement and modeling application 106 can be driven on what is effectively, a crowd-sourced information knowledge base. In some embodiments, this crowd-sourced model and can be used in conjunction with the aforementioned methods and systems of operation, wherein the crowd-sourced model can be accessed and searched for existing user information. If no information based on an existing user can be found, the aforementioned "standard" method of creating a virtual model or retrieving physical mannequin modeling images can be performed.

As noted above, in some embodiments clothing database 130 may be populated with information regarding clothing characteristics obtained automatically, i.e., without a need for manually measuring clothing and/or manually entering such information. To automatically obtain clothing characteristics information, an unmanned vehicle, such as an unmanned aerial vehicle (e.g., drone) may be used to capture images/video of mannequins wearing items of clothing.

Figure 4:
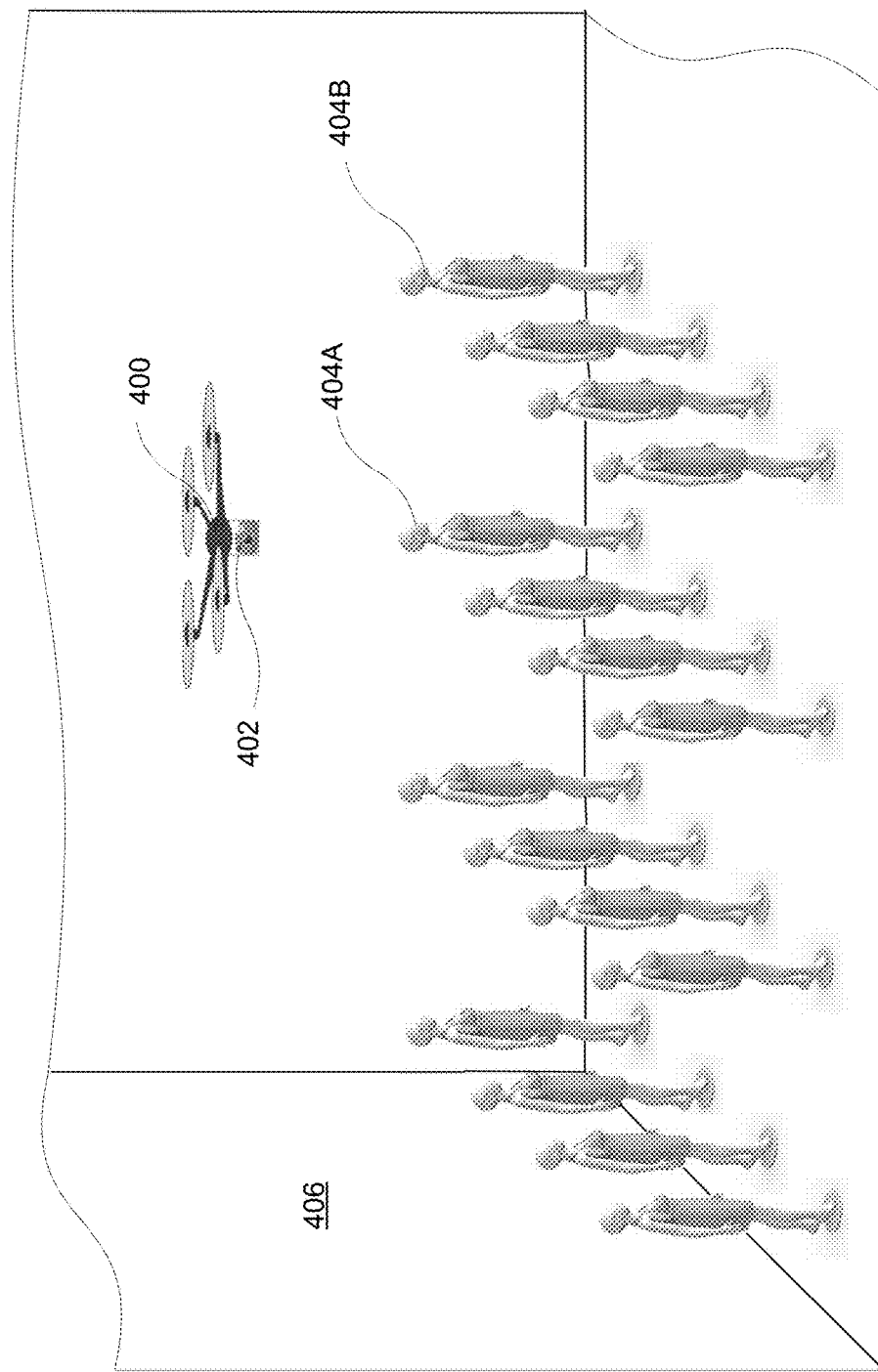
FIG. 4 illustrates an example clothing data collection scenario in accordance with one embodiment.

As illustrated in FIG. 4, a drone 400 may be equipped with one or more cameras, e.g., camera 402. Camera 402 may capture images, e.g., two images, such as a front view image and a side view image of a plurality of mannequins (404A, 404B, etc.) in a location, such as a warehouse 406. These images may be utilized to derive clothing measurements and characteristics, similar to the manner in which a subject's body measurements are derived from images (described above). In some embodiments, different sized clothing may be worn by different sized/differently proportioned mannequins. Provided that in each instance, the clothing fits in an intended manner, relevant measurements regarding the clothing can be determined based on how the clothing lies/drapes/covers each mannequin. For example, mannequins with different proportions can be outfitted with each available size of a particular item of clothing.

Drone 400 can be controlled to fly over, around, or otherwise about each mannequin, or in a manner allowing the requisite images to be captured by camera 402. Images captured by camera 402 may be transmitted or transferred to server 120 or similar server or other processing device/system comprising at least a virtual body measurement component, such as virtual body measurement component 124. In some embodiments camera 402 may be connected to an application interface (much like smartphone 106 is operatively connected to server 120 via network 110) of such a server to allow images to be transferred to a virtual body measurement component that can derive the relevant clothing measurements being worn on the mannequins. Such clothing measurements and/or other relevant characteristics of the clothing being worn by the mannequins may be uploaded to clothing database 130. In some embodiments, one or more of these images may be used as representative clothing images presented to the user through the clothing selection interface of the virtual measurement and modeling application described above.

Figure 5:
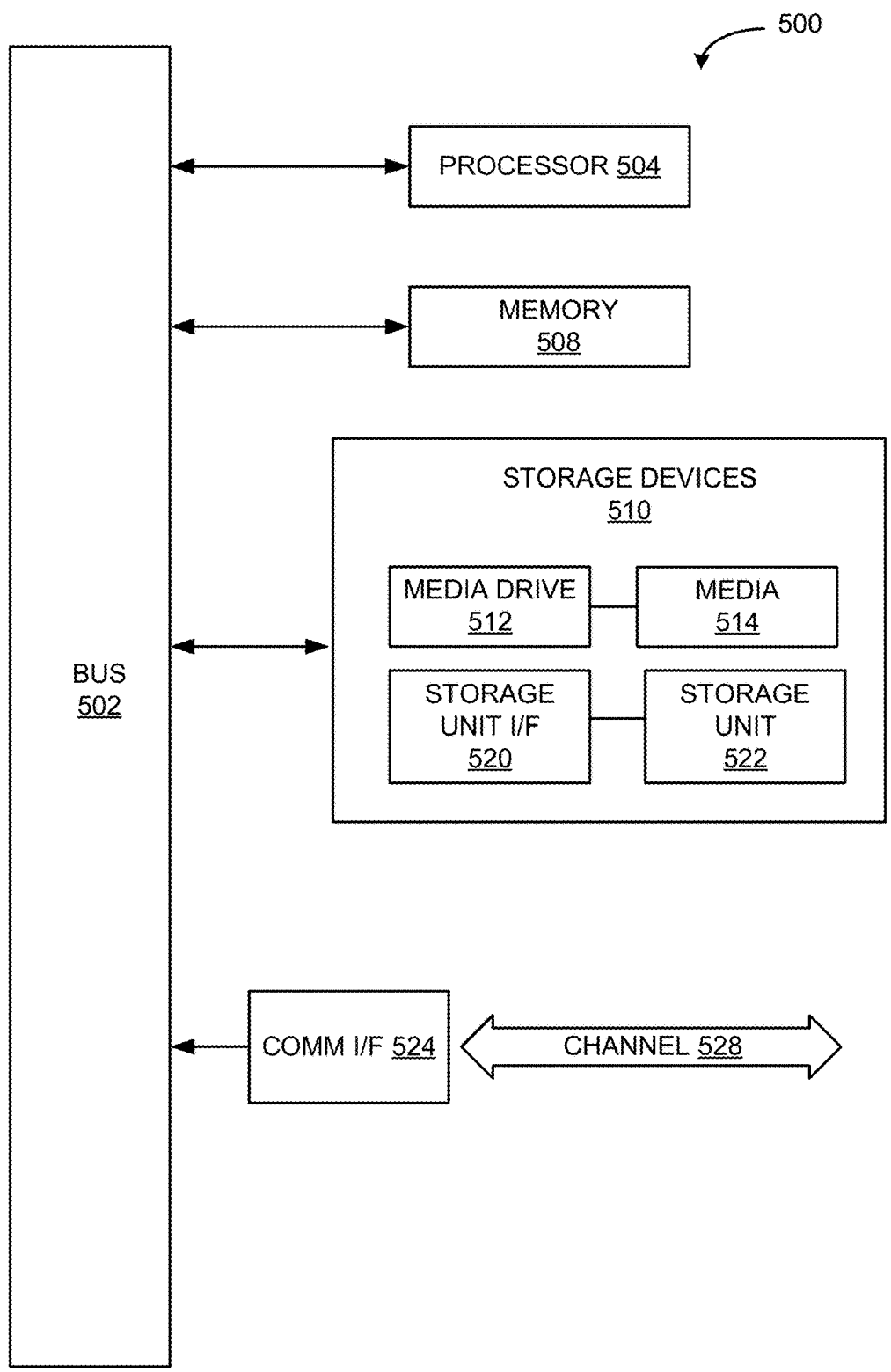
FIG. 5 is an example computing component that may be used to implement various features of embodiments described in the present disclosure.

FIG. 5 illustrates an example computing component that may be used to implement various features of the system and methods disclosed herein, for example, one or more elements of system 100.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example—computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example navigation systems, portable computing devices, and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a server including one or more processors and a memory storing instructions that, when executed by the one or more processors, cause the server to:
   derive body measurements of a human subject from a plurality of two-dimensional (2D) images representative of the human subject's body, wherein the plurality of 2D images are obtained from a single user device;
   generate a virtual model representative of the human subject based on the derived measurements such that the virtual model comprises a body having one or more portions thereof that are equivalent to that of the human subject;
   obtain information regarding characteristics of one or more items of clothing, wherein the information regarding the characteristics of the one or more actual items of clothing are obtained by deriving measurements of the one or more actual items of clothing from a plurality of images representative of the one or more actual items of clothing being worn by one or more physical mannequins, the plurality of images having been obtained by capturing images of the actual items of clothing by one or more camera-equipped unmanned vehicles traversing one or more routes about one or more physical mannequins; and
   present a virtual three-dimensional (3D) rending of the virtual model outfitted with one or more images of actual items of clothing, the virtual 3D rendering representing the characteristics of the one or more actual items of clothing relative to the virtual model.

2. The system of claim 1, wherein the user device further performs a quality check of each of the plurality of images to determine suitability of each of the plurality of images for the derivation of the body measurements.

3. The system of claim 1, wherein the plurality of images comprise a first image representative of a front view of the human subject, and a second image representative of a side view of the human subject.

4. The system of claim 3, wherein the instructions causing the system to derive the body measurements comprises instructions causing the system to derive vertically-based body measurements from the first image.

5. The system of claim 3, wherein the instructions causing the system to derive the body measurements comprises instructions causing the system to derive girth-based body measurements from the second image.

6. The system of claim 1, wherein the instructions causing the server to obtain information regarding the characteristics of the one or more actual items of clothing comprise instructions causing the server to access a database in which the information regarding the characteristics of the one or more actual items of clothing are stored.

\* \* \* \* \*